(12) United States Patent
Nelson et al.

(10) Patent No.: US 8,139,952 B2
(45) Date of Patent: Mar. 20, 2012

(54) SYSTEM AND METHOD FOR MEASURING THE EXTINCTION RATIO OF AN OPTICAL TRANSMITTER USING AN INTERFEROGRAM WING-TO-PEAK RATIO

(75) Inventors: Lynn E. Nelson, Matawan, NJ (US); Mikhail Brodsky, Millburn, NJ (US); Jungmi Oh, Holmdel, NJ (US); Cristian Antonelli, Sulmona L'Aquila (IT); Paul Shala Henry, Holmdel, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 436 days.

(21) Appl. No.: 12/383,300

(22) Filed: Mar. 23, 2009

(65) Prior Publication Data

US 2010/0239244 A1 Sep. 23, 2010

(51) Int. Cl.
*H04B 10/04* (2006.01)
*H04B 10/08* (2006.01)
*H04B 10/00* (2006.01)

(52) U.S. Cl. ............................ 398/182; 398/25; 398/161

(58) Field of Classification Search .................. 398/182, 398/25, 27, 38, 192, 195, 198, 201, 161
See application file for complete search history.

(56) References Cited

U.S. PATENT DOCUMENTS 7,400,896 B2 * 7/2008 Ok et al. ........................ 455/506
2005/0265321 A1 * 12/2005 Rappaport et al. ............ 370/352

* cited by examiner

*Primary Examiner* — Dawayne A Pinkney

(57) ABSTRACT

Systems and methods are described that derive a relationship between an optical transmitter's extinction ratio ($E_r$) and its interferogram wing-to-peak ratio ($I_{wp}$). The change in an optical transmitter's $I_{wp}$ correlates with a change in measured $E_r$. As the $E_r$ of a telecom signal changes, the power of the modulated signal's interferogram wings change. After a relationship between $I_{wp}$ and measured $E_r$ has been derived for an optical transmitter, the relationship may be used after deployment to determine an $E_r$ by measuring an $I_{wp}$.

20 Claims, 16 Drawing Sheets

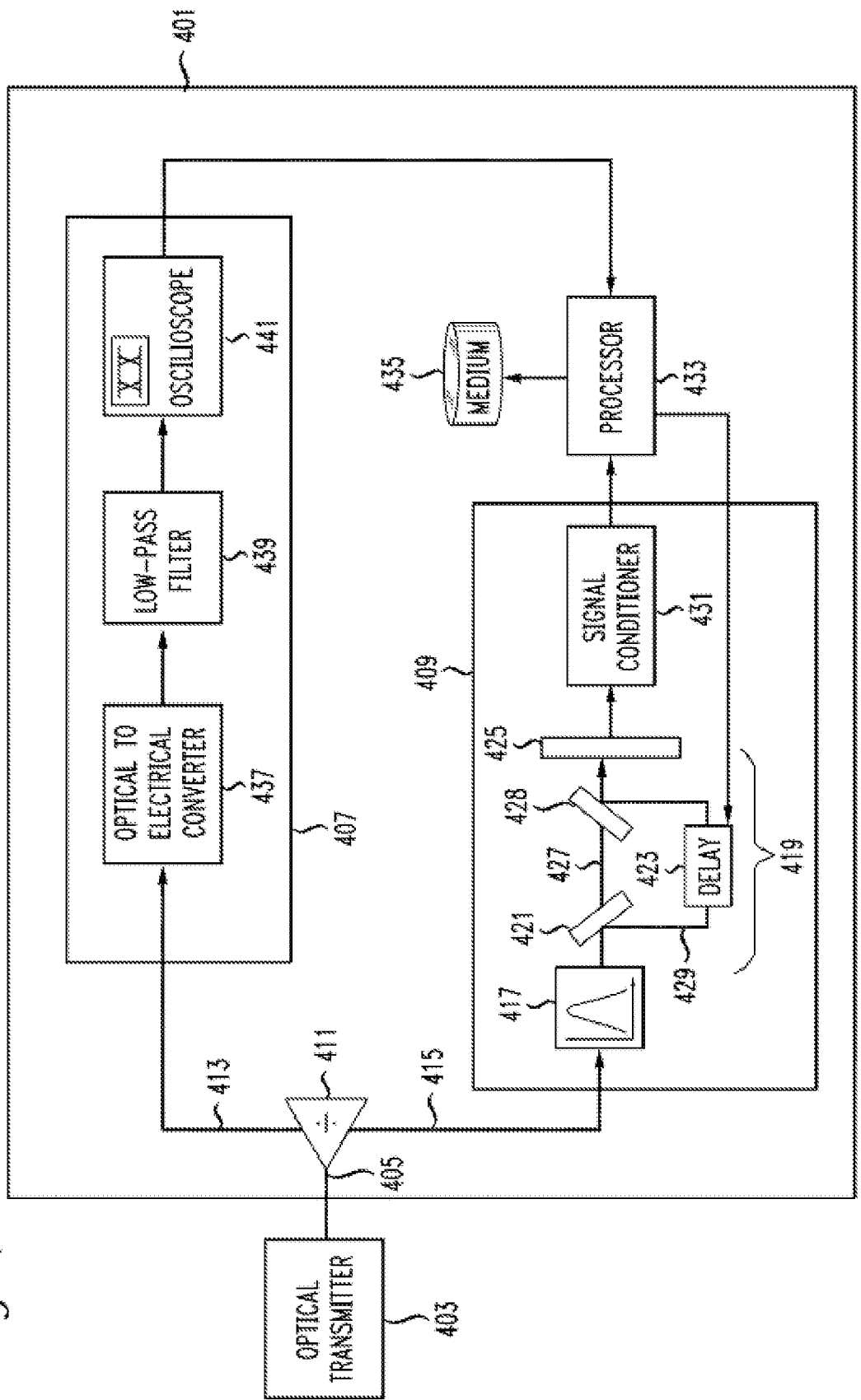

SYSTEM AND METHOD FOR MEASURING THE EXTINCTION RATIO OF AN OPTICAL TRANSMITTER USING AN INTERFEROGRAM WING-TO-PEAK RATIO

BACKGROUND OF THE INVENTION

The invention relates generally to measuring the extinction ratio ($E_r$) of an optical transmitter. More specifically, the invention relates to systems and methods that use interferometry to derive a relationship between interferogram wing-to-peak ratios ($I_{wp}$) and measured $E_r$ for an optical transmitter and may use the relationship after deployment to determine an $E_r$ by measuring an $I_{wp}$.

The parameter that best describes the overall health of a communication system is Bit Error Ratio (BER). Most digital communications systems are capable of error-free communication if transmitter powers are kept high enough and fiber attenuation is kept low enough. To obviate costly optical regenerators, it is desirable to have the longest span possible between a transmitter and receiver.

Lengthening the transmission span too far will eventually degrade the system BER, as signal levels drop and noise becomes dominant over the signal at the receiver. However, transmitter extinction ratio ($E_r$) will also impact the allowable length of a transmission system. Historically, it has been difficult to achieve accurate and repeatable $E_r$ measurements.

$E_r$ is used to describe optimal biasing conditions of optical transmitters and how efficiently the available laser transmitter power is converted to modulation power. For example, a transmitter for long-haul transmission may comprise a distributed-feedback laser and an external Mach-Zehnder modulator. FIG. 1 shows a modulator as an integrated optical waveguide on a material that exhibits an electro-optic effect, where the material's index of refraction can be changed by applying a voltage. The purpose of the modulator is to convert an electrical data signal of logic level 1's and 0's, shown as the voltage V(t) applied relative to ground (denoted as 0V), to an optical signal at its output I(t) that is "on" for a logic level 1 and nearly "off" for a logic level 0. Due to the structure of the modulator and the electro-optic effect, the output power of the modulator will vary as $$I(t) = \frac{I_0}{2}\left(1 + \cos\left(\pi \frac{V(t)}{V_\pi} + \phi\right)\right), \quad (1)$$

with the applied voltage V(t) as shown in FIG. 2. This relation is called the modulation transfer function, and $I_0$ is the maximum power at the modulator output. The switching voltage $V_\pi$ is the difference in voltage required to switch the modulator from a full "on" state, where the output power is maximum, to a full "off" state, where the output power is minimum. The phase shift $\phi$ is nominally zero, but is included in (1) to account for slight shifts of the modulation transfer function due to temperature variation and modulator aging. The applied voltage V(t) can be divided into two parts $$V(t) = V_{bias} + V_{AC}(t), \quad (2)$$

where $V_{bias}$ is a DC bias voltage that is constant in time and $V_{AC}(t)$ is an ac drive voltage that varies in time. $V_{bias}$ is applied to optimally operate the modulator and is usually set to position the modulator on the modulation transfer function so that the output power is one-half of its maximum when $V_{AC}(t)=0$. An ac drive voltage $V_{AC}(t)$ with a magnitude of $V_\pi$ is then applied to switch the modulator from maximum transmission to minimum transmission, in accordance with the data signal (i.e. at the same rate and with the same pattern of logic level 1's and 0's). $V_{bias}$ can be set to operate (i.e. bias) the modulator on the positive slope $V_{bias+}$ of the transfer function (i.e. where the modulator transmission increases with increasing applied voltage). Or $V_{bias}$ can be set to operate the modulator on the negative slope $V_{bias-}$ of the transfer function (i.e. where the modulator transmission increases with decreasing applied voltage).

$E_r$ is the ratio of the power used to transmit a logic level 1 to the power used to transmit a logic level 0 and may be defined as a linear ratio in decibels or as a percentage. In dB, $$\text{extinction ratio} = 10\log_{10}\frac{\text{logic 1 power level}}{\text{logic 0 power level}}. \quad (3)$$

FIG. 3 shows an eye-diagram that is commonly used to illustrate $E_r$. Transmitter $E_r$ is typically obtained from an eye-diagram.

Good BER performance is achieved when there is significant separation between the power level used to transmit a logical 1 and the power level used to transmit a logical 0. The difference between the two power levels describes the modulation power of the transmitted signal. The larger the modulation power, the easier it will be for a system receiver to accurately determine what signal level is present. $E_r$ values in the range of 10 to 20 (10 to 13 dB) are common for high-speed, externally modulated lasers used in optical transmitters.

As optical transmitters age, the switching voltage $V_\pi$ of the modulator may increase and/or the optimal bias voltage may increase or decrease compared to the original. If the modulator bias voltage and/or the AC drive are no longer of the correct value, then the optical power in the logic level 1's is less than the maximum output from the modulator and the optical power in the logic level 0's is greater than the minimum output from the modulator, and therefore the modulated signal's output $E_r$ degrades. Since $E_r$ is an important performance monitor parameter, other measurement methods besides using a fast digital oscilloscope are desired. What is desired is a system and method that measures the $E_r$ of an optical transmitter using interferometry.

SUMMARY OF THE INVENTION

The inventors have discovered that it would be desirable to have systems and methods that derive a relationship between an optical transmitter's $E_r$ and its interferogram wing-to-peak ratio ($I_{wp}$). The change in an optical transmitter's interferogram wing-to-peak ratio correlates with a change in measured $E_r$. As the $E_r$ of a telecom signal changes, the power of the modulated signal's interferogram wings change.

One aspect of the invention provides a method for deriving a relationship between an optical transmitter's output signal interferogram wing-to-peak ratio ($I_{wp}$) and its extinction ratio ($E_r$). Methods according to this aspect of the invention include setting the optical transmitter modulation condition V(t) to nominal, deriving an $I_{wp}$ to measured $E_r$ relationship data set comprising measuring the optical transmitter's output signal $E_r$, calculating an $I_{wp}$, and storing the measured $E_r$ and associated $I_{wp}$, varying the optical transmitter modulation condition V(t) from nominal in predetermined steps to derive new relationship data sets while the optical transmitter's output signal measured $E_r$ is within a range of interest, and fitting all derived relationship data sets as an expression equating $I_{wp}$ to $E_r$.

Another aspect of the invention is a method for measuring an optical transmitter extinction ratio ($E_r$) using a relationship between the transmitter's interferogram wing-to-peak ratio ($I_{wp}$) and an empirical $E_r$ measurement. Methods according to this aspect of the invention include tapping into an optical line downstream of the optical transmitter, acquiring light from the downstream line, coupling the light to a bandpass filter, selecting a predetermined optical bandwidth, inputting the light into an interferometer, setting the delay of a first interferometer path such that the difference of the delays between the first interferometer path and a second interferometer path (relative delay τ) is zero, measuring peak power at τ=0, setting the delay of the first interferometer path such that the difference of the delays between the first and second interferometer paths (relative delay τ) is a large delay $τ_{wing}$, measuring wing power at $τ=τ_{wing}$, and calculating a ratio ($I_{wp}$) between the wing and peak powers, and using the relationship between the transmitter's $I_{wp}$ and empirical $E_r$ measurement, looking-up an $E_r$ corresponding to the calculated $I_{wp}$.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 4 is an exemplary optical transmitter calibration system architecture.

DETAILED DESCRIPTION

Figure 1:
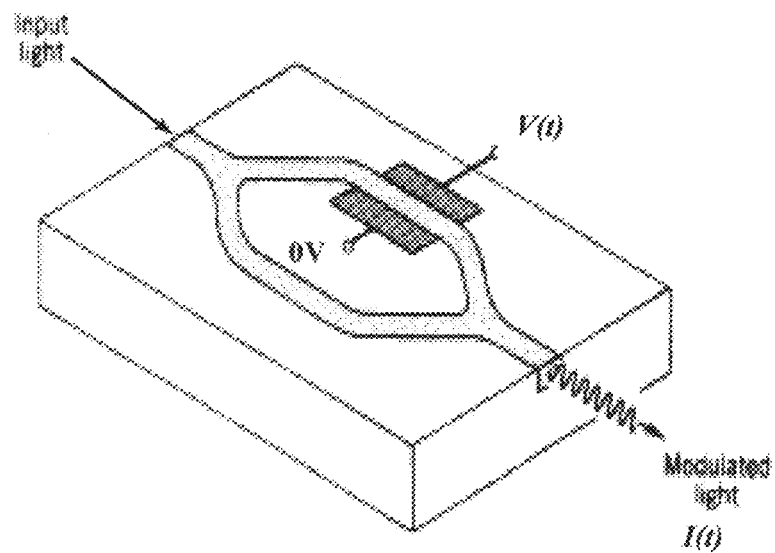
FIG. 1 is an exemplary external Mach-Zehnder modulator with a voltage V(t) applied to one optical path.
Figure 2:
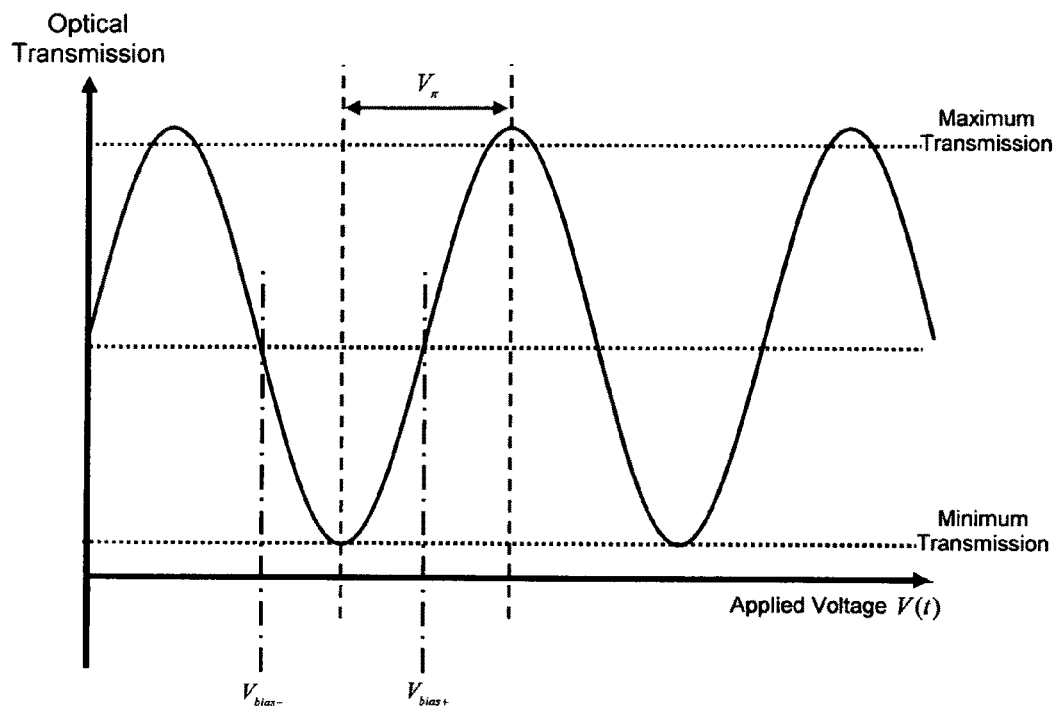
FIG. 2 is an exemplary curve of the transmission of a Mach-Zehnder modulator versus an applied voltage $$I(t) = \frac{I_0}{2}\left(1 + \cos\left(\pi\frac{V_{bias}}{V_\pi} + \pi\frac{V_{AC}(t)}{V_\pi} + \phi\right)\right). \quad (4)$$
Figure 3:
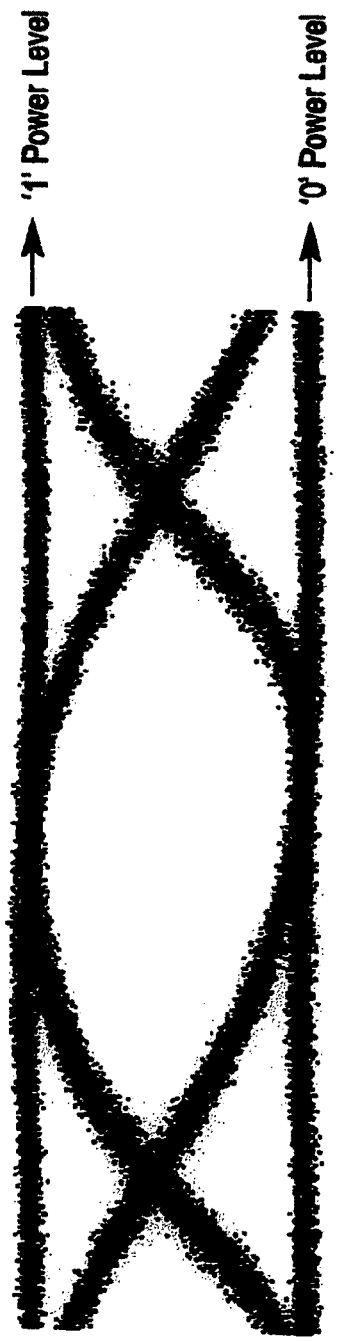
FIG. 3 is an exemplary eye-diagram showing the logic level 1 and 0 power levels used for calculating extinction ratio ($E_r$).
Figure 5A:
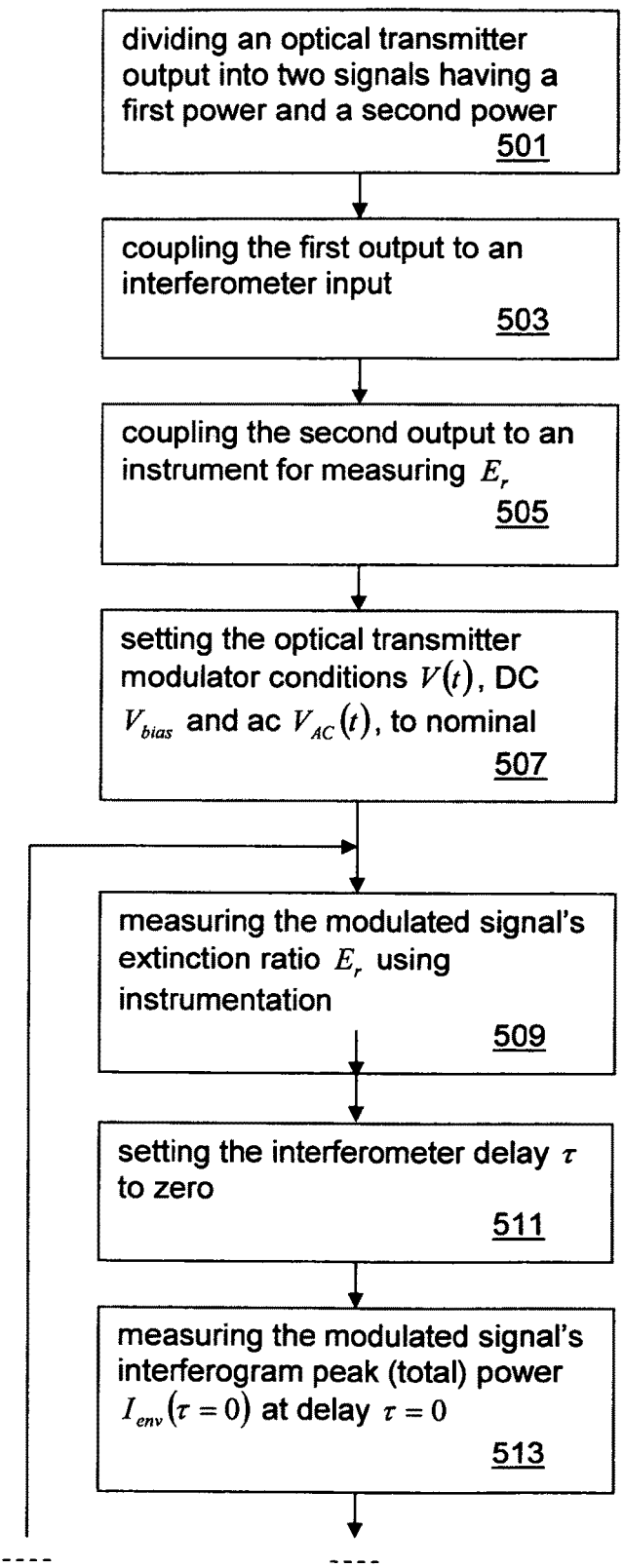
FIG. 5 is an exemplary optical transmitter calibration method.
Figure 5B:
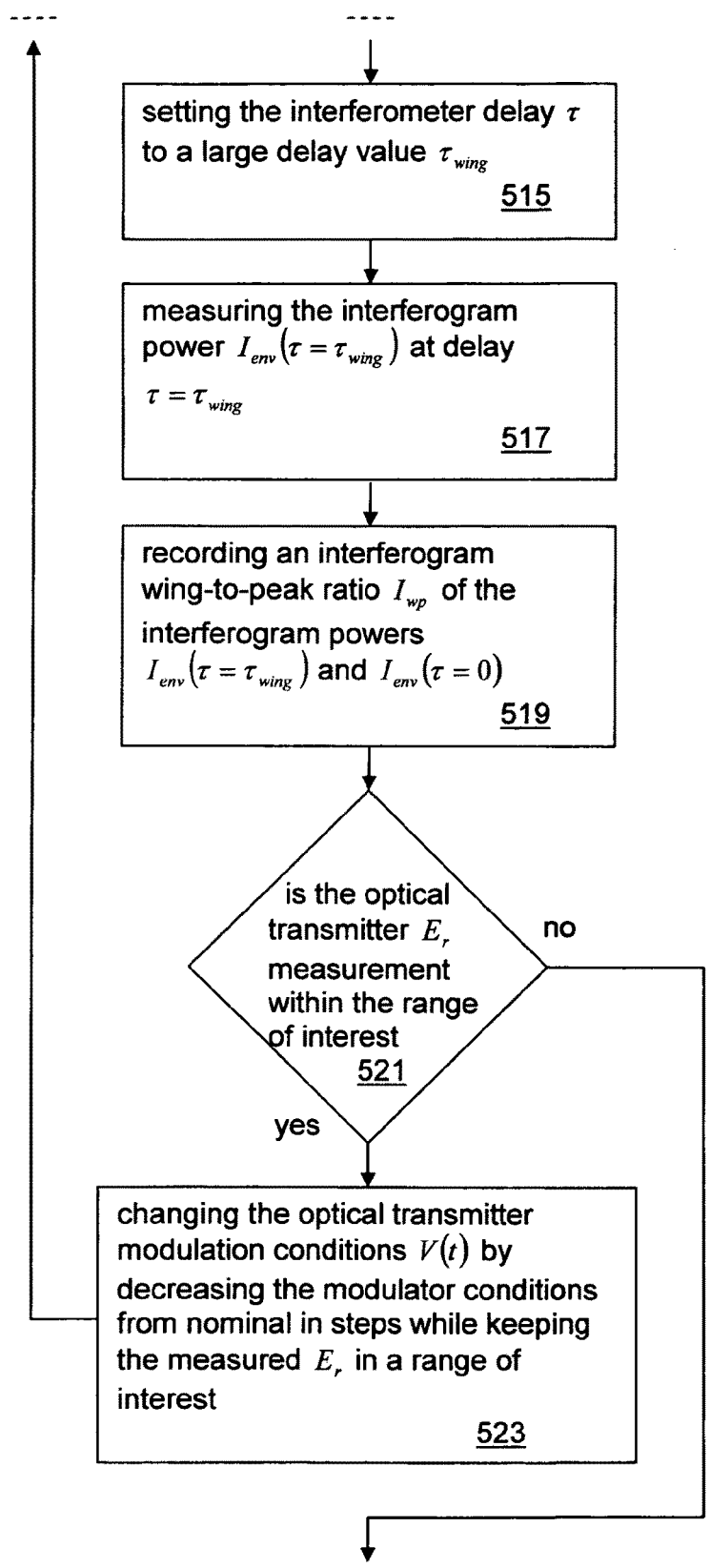
Figure 5C:
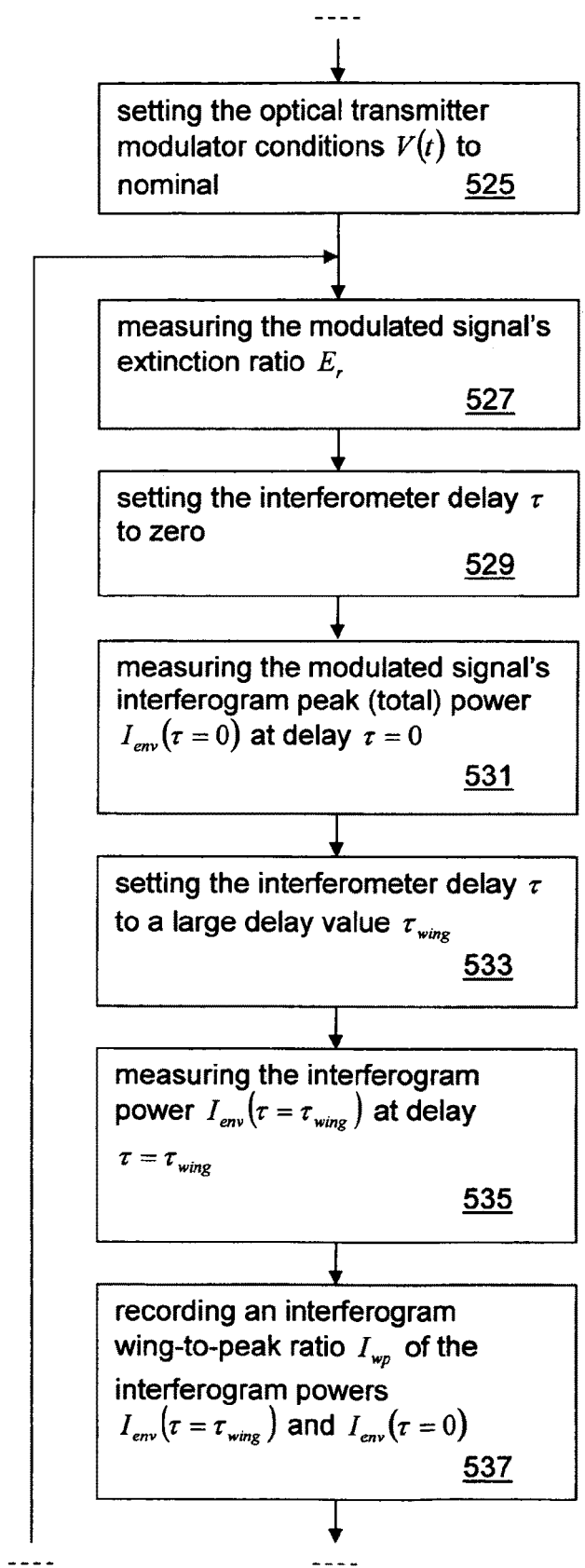
Figure 5D:
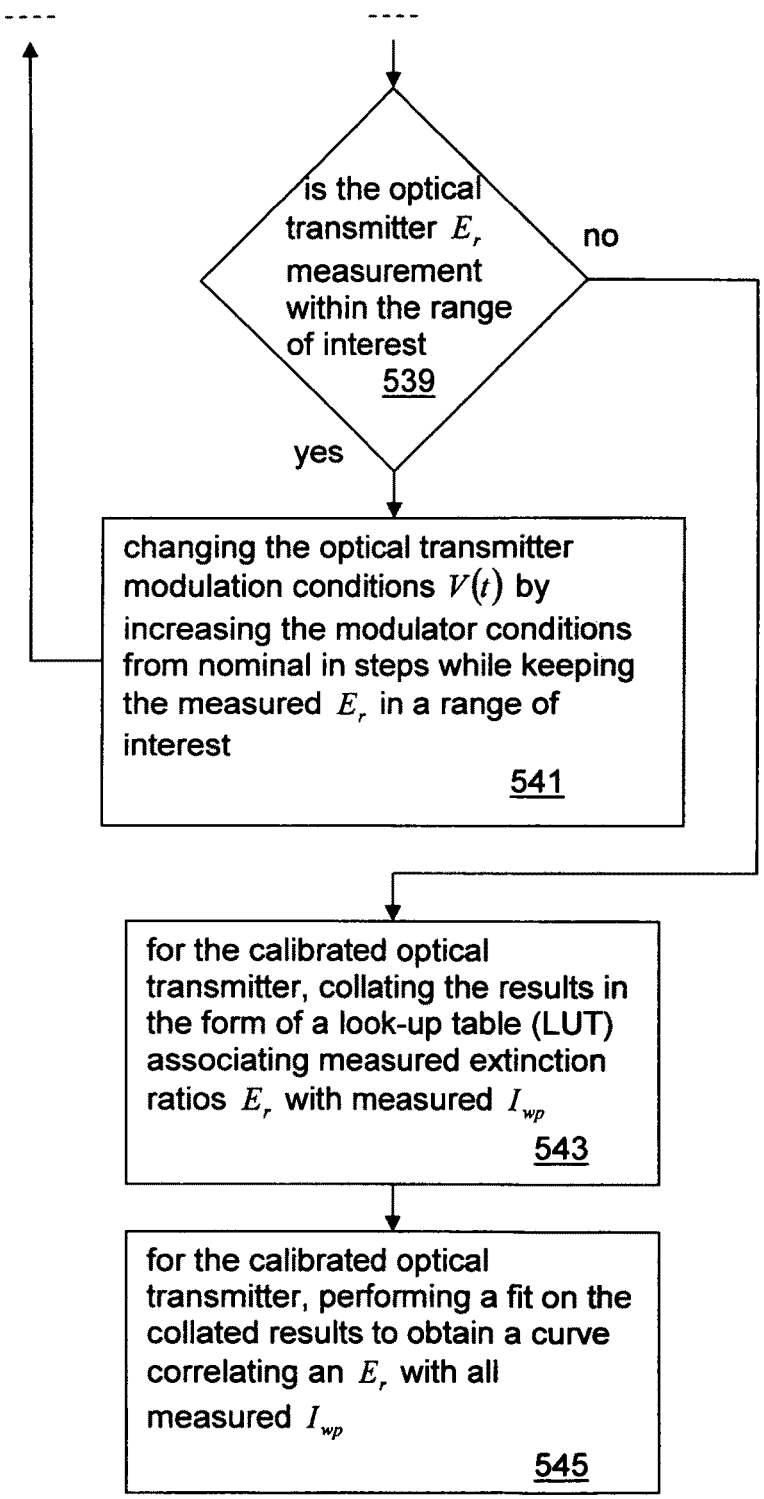
Figures 6B, 6D:
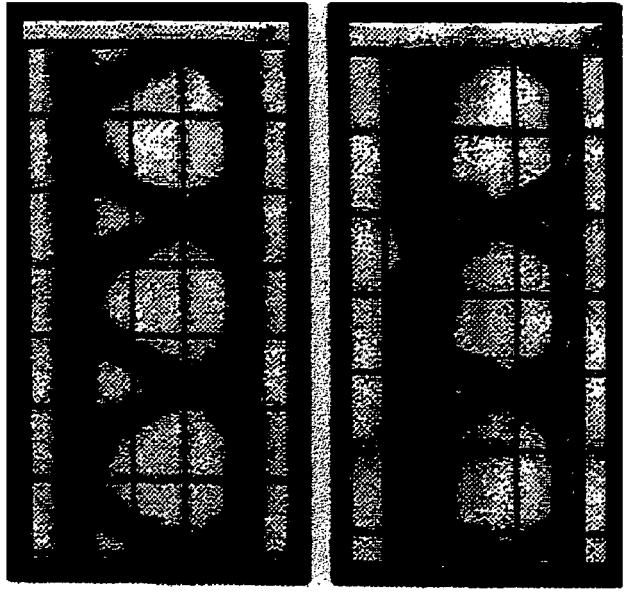
FIGS. 6A-D are exemplary eye-diagrams showing an optical transmitter comprising a distributed feedback laser followed by an external Mach-Zehnder modulator being A) over-biased, B) under-biased, C) under-driven and D) over-driven.
Figures 6A, 6C:
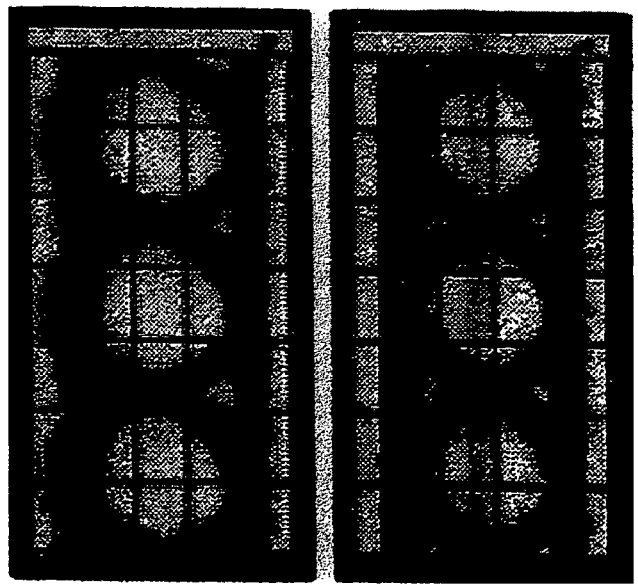

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items.

The terms "connected" and "coupled" are used broadly and encompass both direct and indirect connecting, and coupling. Further, "connected" and "coupled" are not restricted to physical or mechanical connections or couplings.

It should be noted that the invention is not limited to any particular software language described or that is implied in the figures. One of ordinary skill in the art will understand that a variety of alternative software languages may be used for implementation of the invention. It should also be understood that some of the components and items are illustrated and described as if they were hardware elements, as is common practice within the art. However, one of ordinary skill in the art, and based on a reading of this detailed description, would understand that, in at least one embodiment, components in the method and system may be implemented in software or hardware.

Embodiments of the invention provide methods, system frameworks, and a computer-usable medium storing computer-readable instructions for deriving a relationship between an optical transmitter's $E_r$ and an optical transmitter's interferogram wing-to-peak ratio ($I_{wp}$). An interferometer distinguishes between a coherent optical signal and an incoherent noise occupying the same optical bandwidth. Methods and systems vary a transmitter's modulation biasing condition while measuring an $I_{wp}$ in conjunction with a high-speed oscilloscope measured $E_r$. Methods and systems use the relationship for a particular transmitter to measure $E_r$ using interferometry when the transmitter is deployed (and/or when a high-speed oscilloscope is not available). The invention may be enabled as a modular framework and/or deployed as software as an application program tangibly embodied on a program storage device. The application code for execution can reside on a plurality of different types of computer readable media known to those skilled in the art.

An optical transmitter's modulated output signal interferogram shape correlates with the transmitter's modulated output signal $E_r$. As an optical transmitter's $E_r$ degrades over time, its corresponding interferogram evolves in one of two ways depending on the modulation conditions. Two parameters, $E_r$ and the modulator conditions $V_{bias}$ and $V_{AC}$(t), affect a modulated signal's interferogram. Embodiments extract signal power from an interferogram shape, and correlate the dependence of the signal's interferogram shape (power) with its measured $E_r$. By adjusting the amplitude of $V_{bias}$ and/or the amplitude of $V_{AC}$(t) applied to an optical transmitter's modulator, a relationship between an interferogram's shape and measured $E_r$ may be derived for the optical transmitter.

Interferometry is the technique of using the pattern of interference created by the superposition of two or more waves to diagnose the properties of the waves. The instrument used to interfere the waves together is an interferometer.

A single incoming beam of light is split into two identical beams by a partially silvered mirror. Each beam travels a different path before they are recombined at a detector. The difference in the distance traveled by each beam (path difference) creates a time delay of one beam relative to the other beam (called the relative delay τ) and thereby a phase difference between the two beams. Varying the introduced phase difference between the initially identical waves creates an interference pattern, or interferogram. If a single beam has been split along two paths, then the phase difference is diagnostic of anything that changes the phase along the paths. If the two paths differ by a whole number (including 0) of wavelengths, there is constructive interference and a strong signal at the detector. If they differ by a whole number and a half wavelength (e.g., 0.5, 1.5, 2.5, . . . ) there is destructive interference and a weak signal. The effect of the interference is to alter the ratio of the light which heads for the detector and the remainder of the light which heads back in the direction of the source.

FIG. 4 shows an optical transmitter calibration system 401 according to one embodiment. FIG. 5 shows a method.

The system 401 correlates an optical transmitter's 403 modulated output signal 405 $E_r$ as measured by an oscilloscope system 407 with the shape of its interferogram produced by an interferometer system 409. The output signal 405 is coupled to an optical divider or splitter 411 for dividing the modulated output signal 405 into two optical paths of equal or non-equal power. The divider 411 may be partially silvered mirrors, a prism, or other similar device for re-routing two predefined optical power percentages of the modulated output signal 405 as an oscilloscope system input 413 and an interferometer system input 415.

The interferometer system input 415 is coupled to an optical bandpass filter 417. The bandpass filter 417 is configured to be centered on a signal channel transported in the fiber 415. The bandpass filter 417 is of the same type as the bandpass filter that would be used in a deployed system to select one channel from a plurality of signal channels. The bandpass filter 417 output is coupled to an interferometer 419 that may include a splitter 421, a delay means 423 and a photodetector 425. The splitter 421 may be another partially silvered mirror for forming two beams from the filtered beam. Embodiments use a Michelson interferometer, but other interferometers may be used.

A first portion 427 of the filtered beam travels directly to the detector 425. A second portion 429 of the beam travels through the delay means 423 for introducing a relative delay τ into the beam 429. The delay means 423 may be a length of optical fiber or planar waveguide providing a fixed, known delay. Other means known in the art, such as thermo-optic techniques or a free space moving mirror, may be used to introduce an adjustable delay into the beam 429.

The beams 427, 429 recombine at another partially silvered mirror (or fiber optic coupler) 428 and then interfere on the surface of the detector 425. The total power of the recombined beams on the detector 425 depends on the interferometer relative delay τ between the two beams, as well as on the characteristics of the input signal 415. As the delay means 423 is varied, the beams interfere either constructively or destructively on the surface of the detector 425, forming an interference pattern in which the power on the detector has rapid oscillations with the relative delay τ at the center frequency $f_0$ of the channel. The oscillatory pattern is confined within a bell-shaped envelope having a peak and two asymptotic wings, the envelope having a bandwidth of about $$\frac{1}{B}$$

where B is the bandwidth of the signal channel. Coupled to the detector 425 is a signal conditioner 431, which processes the interference pattern by determining the interferogram envelope from the fast oscillations.

A processor 433 receives and processes the interferogram envelope data from the signal conditioner 431. In one embodiment, the processor 433 is a component of a computer (not shown). In addition to the processor 433, the computer may include memory, a reader for reading computer executable instructions on computer readable media, a common communication bus, a communication suite with external ports, a network protocol suite with external ports and a graphical user interface, as is well known in the art.

The processor 433 includes or is coupled to one or more computer readable media 435, such as a hard or floppy disk in a disk drive, a magnetic tape in a tape drive, a nonvolatile programmable ROM chip such as an EPROM, or volatile computer memory.

The computer readable medium 435 contains instructions that, when executed by the processor 433, cause the processor 433 to compute a numerical value using the interferogram envelope measurement. The numerical value represents a ratio of the output power of an interferogram envelope when the interferometer delay τ is set to a large value (usually more than 2 bit periods) to the output power of the interferometer when the delay τ is set to zero, hereafter called the interferogram wing-to-peak ratio ($I_{wp}$). The $I_{wp}$ depends on the input signal 415 $E_r$.

The oscilloscope system 407 input 413 is coupled to an Optical-to-Electrical (OE) converter 437, which may be a photodiode for converting optical power into electrical power. The OE converter 437 is coupled to a low-pass filter 439 which may be a fourth-order Bessell-Thomson filter. The frequency response of the photodiode/filter combination may be tailored to the type of signal 413 modulation for a given receiver. The filter 439 output is coupled to a fast storage oscilloscope 441 capable of creating histograms used to determine the logic 1 and 0 levels used for eye-diagrams. The oscilloscope 441 may implement algorithms to calculate $E_r$ over time and is coupled to the processor 433 to compute $I_{wp}$-to-$E_r$ relationships.

The oscilloscope 407 and interferometer 409 systems operate simultaneously to calibrate an optical transmitter 403. The method derives relationships between an optical transmitter 403 $I_{wp}$ and a directly measured $E_r$. The relationships may be derived after the transmitter is assembled or anytime afterward.

For a lightwave $E_0 \exp(j\omega t)$ modulated with a function s(t) (generally complex), the output light power I of an interferometer can be expressed as $$I = \frac{I_0}{2}[1 + Re(A(\tau)e^{i\omega\tau})], \tag{5}$$

where $I_0$ is the full incident power, τ is the relative delay, ω is the optical angular frequency, and A(τ) is the normalized time autocorrelation of the modulation function s(t). (5) may be viewed as fast oscillations at the optical carrier frequency ω encased by an envelope $$I_{env} = \frac{I_0}{2}[1 \pm |A(\tau)|], \quad (6)$$

hereafter called an interferogram.

From (6), an $I_{wp}$ can be determined from $I_{env}(\tau=0)$ when $\tau$ is set equal to zero and $I_{env}(\tau>2\ T)$ when $\tau$ is set to a large delay, usually larger than 2 T, where T is the symbol period of the modulation. The same $E_r$ may be found at two or more distinct transmitter modulator conditions. When the transmitter modulator is operating on the positive slope of the transfer function, over-biasing the modulator is increasing the voltage $V_{bias}$ above the optimal condition where the transmission through the modulator is half of the maximum. Similarly, when the transmitter modulator is operating on the negative slope of the transfer function, over-biasing the modulator is decreasing the voltage $V_{bias}$ below the optimal condition where the transmission through the modulator is half of the maximum. Under-biasing the transmitter modulator is, when the transmitter modulator is operating on the positive slope of the transfer function, decreasing the voltage $V_{bias}$ below the optimal condition where the transmission through the modulator is half of the maximum. Similarly, when the transmitter modulator is operating on the negative slope of the transfer function, under-biasing is increasing the voltage $V_{bias}$ above the optimal condition where the transmission through the modulator is half of the maximum. Under-driving the modulator is decreasing the amplitude of $V_{AC}(T)$ below the modulator's $V_\pi$, whereas over-driving the modulator is increasing the amplitude of $V_{AC}(t)$ above the modulator's $V_\pi$. The different changes manifest themselves as different eye-diagram degradations. FIGS. 6A-D show corresponding eye-diagrams having the same $E_r$ value of 11 dB, but being A) over-biased, B) under-biased, C) under-driven and D) over-driven.

When operating on the positive slope of the modulator transfer function, an optical transmitter's $E_r$ may be degraded from a nominal condition of 12 dB to 6 dB by increasing $V_{bias}$ of the modulator while maintaining the same $V_{AC}(t)$, i.e. over-biasing. The consequence is that the electrical field appears in logic level 0 time slots. The emerging electrical field interferes constructively with that of the logic level 1 time slots if two time slots are superimposed at non-zero interferometer delays. This raises the power level of the interferogram wings.

Figures 7A, 7B:
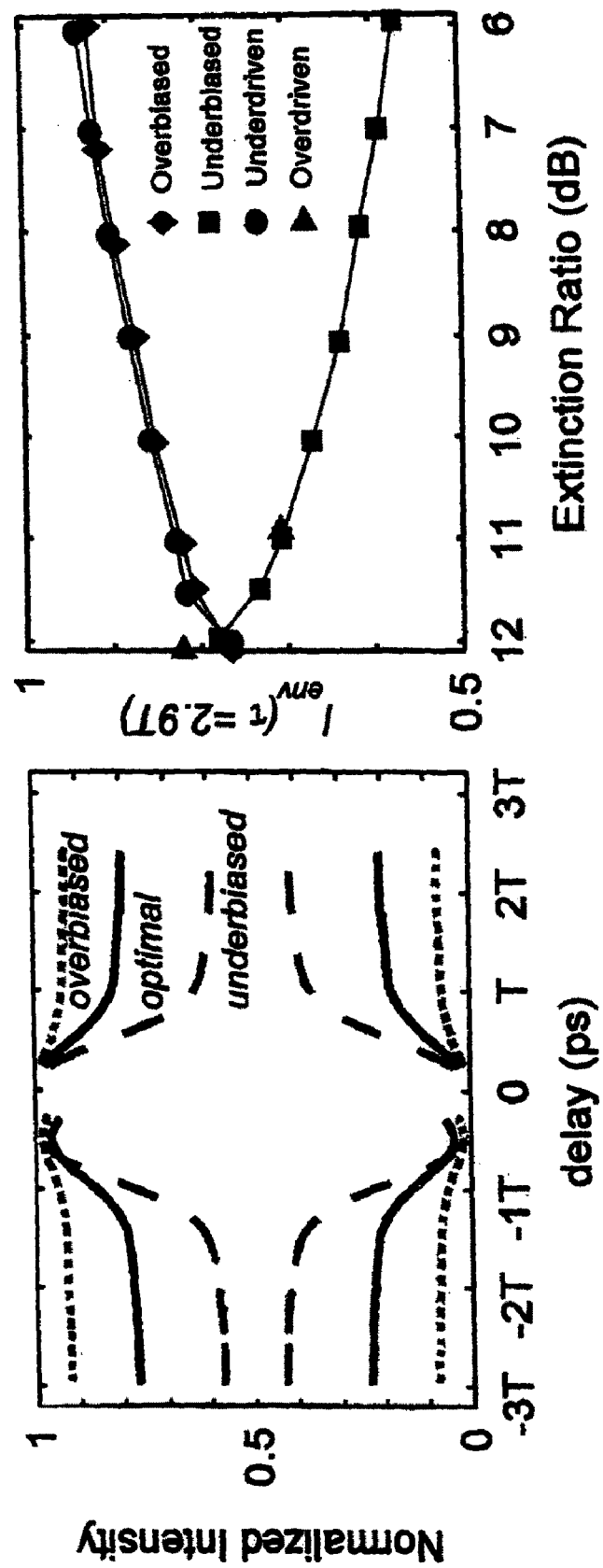
FIG. 7A shows exemplary interferogram envelopes plotted versus relative delay τ for Non-Return-to-Zero (NRZ) modulation having an $E_r$ of 12 dB at optimal bias conditions (solid line), an $E_r$ of 6 dB at over-bias conditions (dotted line) and an $E_r$ of 6 dB at under-biased conditions (broken line).
FIG. 7B is an exemplary plot of power in the wing of an interferogram envelope, where the relative delay τ=2.9 T and T is the symbol period of the modulation, as a function of the $E_r$ for the four modulation conditions of FIGS. 6A-D.

FIG. 7A shows over-biasing as the dotted line envelope for an $E_r$ of 6 dB. For comparison, optimal-biasing is shown as the solid line envelope for an $E_r$ of 12 dB. Under-biasing is shown as the broken line envelope for an $E_r$ of 6 dB.

The different $E_r$ values are obtained by varying $V_{bias}$, while maintaining the same $V_{AC}(t)$. In the under-biased case, at the modulator output, the electric field emerges in the time slots of the logic level 0 bits and has a $\pi$ phase shift in comparison to the field in time slots of the logic level 1 bits. When the under-biased optical signal is coupled to an interferometer with a non-zero relative delay $\tau$, the overlaps between logic level 0 and 1 time slots cause the fields to interfere destructively, and the interferogram wings are reduced.

A range of $E_r$ also is found by under-driving the optical transmitter modulator, i.e. decreasing the amplitude of $V_{AC}(t)$ while maintaining constant $V_{bias}$ or over-driving the optical transmitter modulator, i.e. increasing the amplitude of $V_{AC}(t)$ while maintaining constant $V_{bias}$. The interferograms for the under-driven condition are nearly identical to those of the over-biased condition. Likewise, the interferogram for the over-driven condition is similar to that of the under-biased condition. The similarities indicate that relative phase determines the shape of the interferogram for signals experiencing degraded $E_r$. FIG. 7B shows the results as a plot of the maximum values of the interferogram wings $I_{env}$ at $\tau \approx 2.9$ T as a function of $E_r$ for all four modulation conditions, where the $E_r$ values were measured on a high-speed oscilloscope. The modulation condition for an NRZ input signal is shown over-biased as diamonds, under-driven as circles, under-biased as squares and over-driven as triangles.

The method separates a transmitter's 403 output 405 into two powers 413, 415, the first coupled to the oscilloscope system 407 and the second coupled to the interferometer system 409 (steps 501, 503, 505). The transmitter 403 modulator condition V(t) parameters $V_{bias}$ and $V_{AC}(t)$ are set to a nominal condition (step 507). The nominal condition is achieved when the amplitude of $V_{AC}(t)$ is $V_\pi$ and $V_{bias}$ is set so that the output power I(t) is optimally ½ of its maximum at $V_{AC}(t)=0$. The $E_r$ as measured by the oscilloscope system 407 is recorded (step 509).

Figure 8:
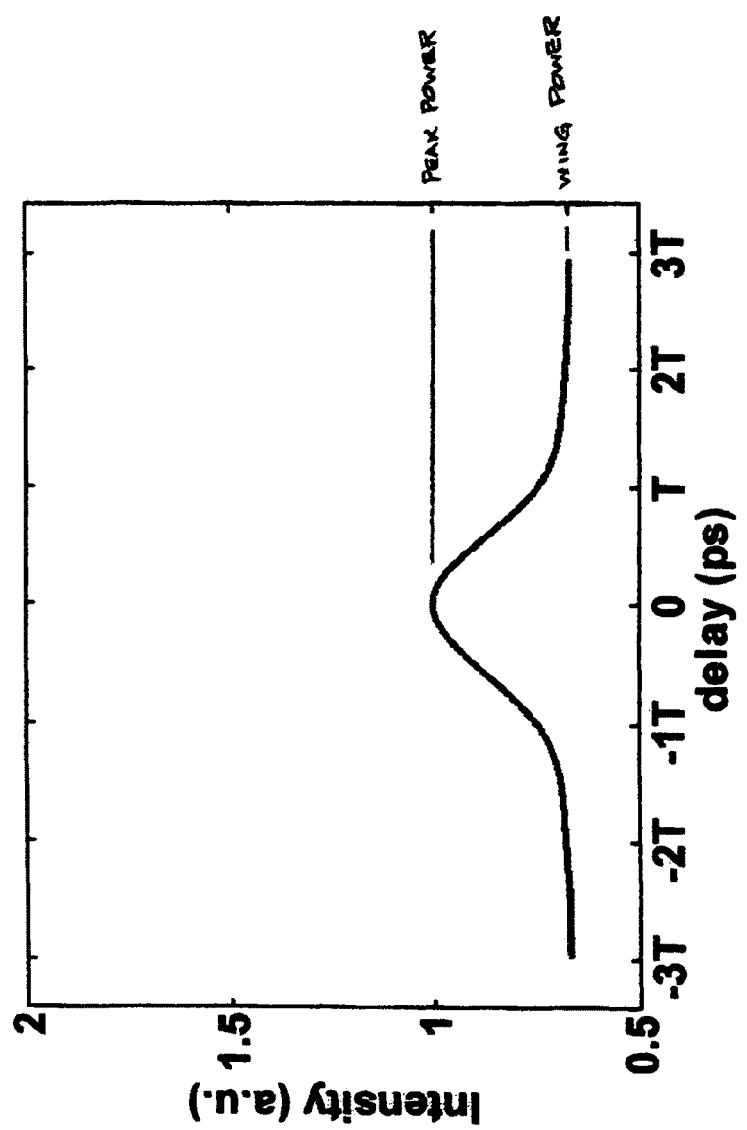
FIG. 8 is an exemplary interferogram envelope plotted versus relative delay τ showing peak power in Arbitrary Units (AU) at relative delay τ=0 and wing power at relative delay $τ=τ_{wing}$.

The interferometer delay 423 is set such that the relative delay $\tau$ is zero and the total power $I_{env}(\tau=0)$ at the output of the interferometer 425 (interferogram peak, FIG. 8) is measured and recorded (steps 511, 513). Alternatively, instead of using the interferometer 419 to measure power when the relative delay $\tau$ is set to zero, a power meter may be substituted to measure the total power of the signal which is equivalent to $I_{env}(\tau=0)$.

The interferometer delay 423 is set such that the relative delay $\tau$ is a large delay $\tau_{wing}$, and the total power $I_{env}(\tau=\tau_{wing})$ at the output of the interferometer (interferogram wing, FIG. 8) is measured and recorded (steps 515, 517). An $I_{wp}$ is calculated from two interferogram power measurements at $I_{env}(\tau=0)$ and $I_{env}(\tau=\tau_{wing})$, and is associated and stored with its measured $E_r$ (step 519).

To derive the relationship between an optical transmitter $I_{wp}$ and directly measured $E_r$, the transmitter's modulation conditions V(t) are first varied by decreasing $V_{bias}$ with the same nominal $V_{AC}(t)$, while maintaining measured $E_r$ in a range of interest, for example, between 6 dB and 15 dB. And second, the transmitter's modulation conditions V(t) are varied by increasing $V_{bias}$ with the same nominal $V_{AC}(t)$, while maintaining $E_r$ in the range of interest.

The modulator $V_{bias}$ is decreased in steps as a percentage of nominal $V_{bias}$ (steps 521, 523). From the nominal modulator $V_{bias}$ setting (step 507), as the modulator $V_{bias}$ is decreased, each $I_{wp}$ measurement is associated with its measured $E_r$. The method is repeated until the $E_r$ range of interest is exceeded (steps 509-519).

After all modulator $V_{bias}$ decreasing steps are performed, the transmitter's modulator $V_{bias}$ is set back to the nominal setting (step 525).

The second part is performed where the modulator $V_{bias}$ is increased while the measured $E_r$ is maintained in the range of interest. The modulator $V_{bias}$ is increased in steps as a percentage of nominal $V_{bias}$ (steps 539, 541). From the nominal modulator $V_{bias}$ setting (step 525), as the modulator $V_{bias}$ is increased, each $I_{wp}$ measurement is associated with its measured $E_r$. The method is repeated until the $E_r$ range of interest is exceeded (steps 527-541).

The data sets ($I_{wp}$ and measured $E_r$) are collated as a Look-up Table (LUT) of $I_{wp}$ (step 543). A quadratic fit may be employed to interpolate $E_r$ between the calculated $I_{wp}$ providing finer $E_r$ resolution between $I_{wp}$ measurements (step 545).

Instead of varying modulator $V_{bias}$ to measure the data sets ($I_{wp}$ and measured $E_r$) to construct the LUT, the transmitter's modulation conditions can also be varied by first increasing and then decreasing the magnitude of $V_{AC}(t)$ with the same nominal constant $V_{bias}$ to over- and under-drive the transmitter, respectively, while maintaining $E_r$ in a range of interest.

The modulator $V_{AC}(t)$ is decreased in steps as a percentage of nominal $V_{AC}(t)$ (steps 521, 523). From the nominal modulator $V_{AC}(t)$ setting (step 507), as the modulator $V_{AC}(t)$ is decreased, each $I_{wp}$ measurement is associated with its measured $E_r$. The method is repeated until the $E_r$ range of interest is exceeded (steps 509-519).

After all modulator $V_{AC}(t)$ decreasing steps are performed, the transmitter's modulator $V_{AC}(t)$ is set back to the nominal setting (step 525).

The second part is performed where the modulator $V_{AC}(t)$ is increased while the $E_r$ is maintained in the range of interest. The modulator $V_{AC}(t)$ is increased in steps as a percentage of nominal $V_{AC}(t)$ (steps 539, 541). From the nominal modulator $V_{AC}(t)$ setting (step 525), as the modulator $V_{AC}(t)$ is increased, each $I_{wp}$ measurement is associated with its measured $E_r$. The method is repeated until the $E_r$ range of interest is exceeded (steps 527-541).

The data sets ($I_{wp}$ and measured $E_r$) are collated as a Lookup Table (LUT) of $I_{wp}$ (step 543). A quadratic fit may be employed to interpolate $E_r$ between the calculated $I_{wp}$ providing finer $E_r$ resolution between $I_{wp}$ measurements (step 545).

If the calibration is performed for over-biasing and under-driving, the data sets ($I_{wp}$ and measured $E_r$) for over-biasing and under-driving should be merged before the fit is performed. Similarly, if the calibration is performed for under-biasing and over-driving, the data sets ($I_{wp}$ and measured $E_r$) for under-biasing and over-driving should be merged before the fit is performed.

Figure 9:
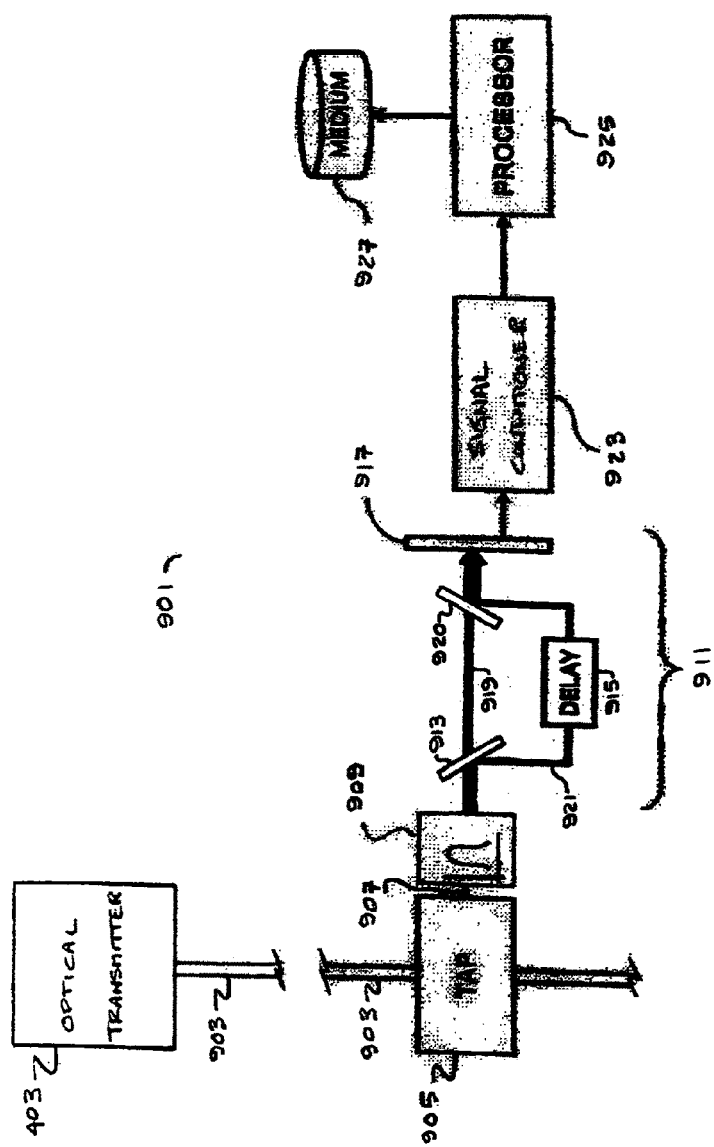
FIG. 9 is an exemplary $E_r$ measurement system architecture.
Figure 10:
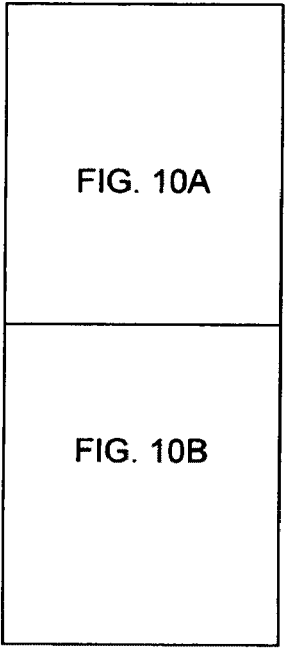
FIG. 10 is an exemplary $E_r$ measurement method.
Figure 10A:
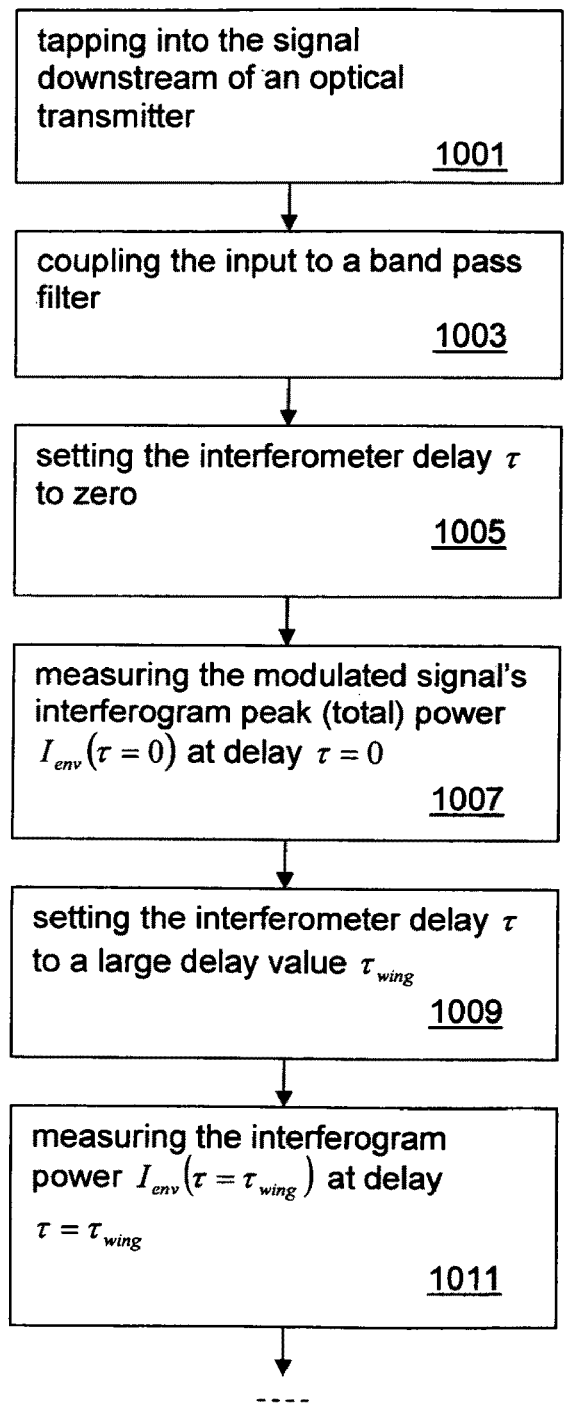
Figure 10B:
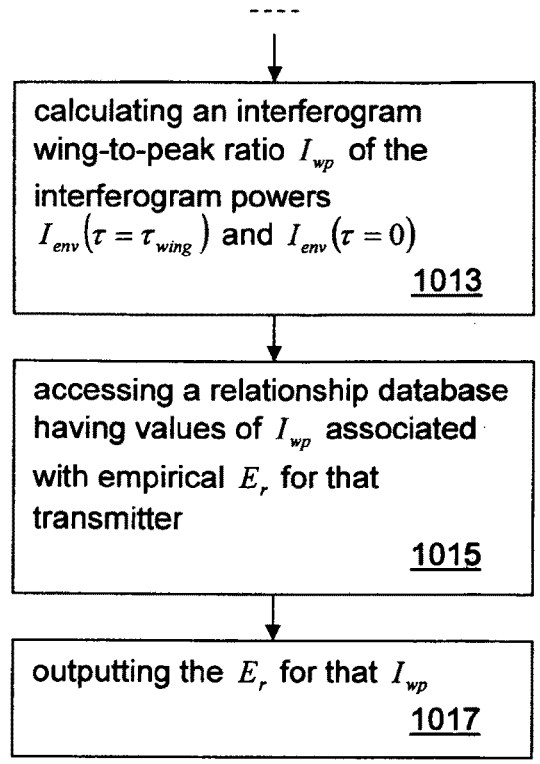

After an optical transmitter's $I_{wp}$ measurements are calibrated to empirical $E_r$'s, the relationship may be used to measure an $E_r$ when the optical transmitter is deployed anywhere downstream of that transmitter, preferably in the absence of optical noise. FIG. 9 shows an $E_r$ measurement system 901 according to one operational embodiment. FIG. 10 shows a method.

The system 901 monitors optical signal channels transmitted in an optical transmission medium 903 such as an optical fiber and includes a tap 905 coupled to the optical fiber 903 for accessing one or more signal channels downstream of the optical transmitter 403. The tap 905 may be a partially silvered mirror or other similar device for re-routing a small percentage of the light signal in the fiber 903 to form a tapped beam 907.

The tapped beam 907 is coupled to a wavelength tunable optical bandpass filter 909. The bandpass filter 909 is configured to select each signal channel out of a plurality of signal channels transported in the fiber 903. The bandpass filter 909 output is coupled to an interferometer 911 that may include a splitter 913, a delay means 915 and a photodetector 917. The splitter 913 may be another partially silvered mirror for forming two beams from the filtered beam. Embodiments use a Michelson interferometer, but other interferometers may be used.

A first portion 919 of the filtered beam travels directly to the detector 917. A second portion 921 of the beam travels through the delay means 915 for introducing a relative delay $\tau$ into the beam 921. The delay means 915 may be a length of optical fiber or planar wave guide providing a fixed, known delay. Other means known in the art, such as thermo-optic techniques or a free space moving mirror, may be used to introduce an adjustable delay into the beam 921.

The beams 919, 921 recombine at another partially silvered mirror (or fiber optic coupler) 920 either constructively or destructively forming an interference pattern on the surface of the detector 917. The power of the recombined beams on the detector 917 depends on the interferometer relative delay $\tau$, as well as on the characteristics of the tapped beam 907, as described above. Coupled to the detector 917 is a signal conditioner 933, which processes the interference pattern by determining the interferogram (the envelope of the fast oscillations).

A processor 925 receives and processes the interferogram measurement data from the signal conditioner 923. In one embodiment, the processor 925 is a component of a computer (not shown). In addition to the processor 925, the computer may include memory, a reader for reading computer executable instructions on computer readable media, a common communication bus, a communication suite with external ports, a network protocol suite with external ports and a graphical user interface, as is well known in the art.

The processor 925 includes or is connected to one or more computer readable media 927, such as a hard or floppy disk in a disk drive, a magnetic tape in a tape drive, a nonvolatile programmable ROM chip such as an EPROM, or volatile computer memory. The computer readable medium 927 contains instructions that, when executed by the processor, cause the processor to compute a numerical value using the interferogram measurement. The numerical value is the $I_{wp}$, the ratio of the output power of the interferogram when the interferometer relative delay is set to a large value (usually more than 2 bit periods) to the output power of the interferogram when the relative delay is set to zero, which depends on the input signal 907 $E_r$.

Embodiments measure an optical transmitter's $E_r$ using the previously derived relationship comparing that actual transmitter's $I_{wp}$ and empirical $E_r$ stored in the media 927. The light from an optical fiber 903 is acquired (step 1001). The light occupies a predetermined optical bandwidth and is input to the wavelength tunable bandpass filter 909. The bandpass filter 909 has an Equivalent Rectangular Bandwidth $\Delta f_{eq}$ and is adjusted to select each signal channel's bandwidth from the plurality of signal channels transported in the optical fiber 903 (step 1003).

The interferometer's 911 delay 915 is adjusted to set the relative delay $\tau$ to zero (step 1005). And the total power at the output of the interferometer $I_{env}(\tau=0)$ is measured (steps 1005, 1007). Alternatively, a power meter may be substituted for the interferometer 911 to measure the total power which is equivalent to $I_{env}(\tau=0)$. The interferometer delay 915 is adjusted to set the relative delay $\tau$ to a large delay $\tau_{wing}$ and the power $I_{env}(\tau=\tau_{wing})$ is measured (steps 1009, 1011). An $I_{wp}$ is calculated from the two measurements at $I_{env}(\tau=0)$ and $I_{env}(\tau=\tau_{wing})$ for the selected signal channel (step 1013).

The calculated $I_{wp}$ is input to the relationship database (LUT) 927 for the selected signal channel and the $E_r$ corresponding to the $I_{wp}$ is output and/or displayed (steps 1015, 1017).

One or more embodiments of the present invention have been described. Nevertheless, it will be understood that various modifications may be made without departing from the spirit and scope of the invention. Accordingly, other embodiments are within the scope of the following claims.

What is claimed is:

1. A method for deriving a relationship between an optical transmitter's output signal interferogram wing-to-peak ratio ($I_{wp}$) and its extinction ratio ($E_r$) comprising:
   setting the optical transmitter modulation condition V(t) to nominal;
   deriving an $I_{wp}$ to measured $E_r$ relationship data set comprising:
      measuring the optical transmitter's output signal $E_r$;
      calculating an $I_{wp}$; and
      storing the measured $E_r$ and associated $I_{wp}$;
   varying the optical transmitter modulation condition V(t) from nominal in predetermined steps to derive new relationship data sets while the optical transmitter's output signal measured $E_r$ is within a range of interest; and
   fitting, by a processor, all derived relationship data sets as an expression equating $I_{wp}$ to $E_r$.

2. The method according to claim 1 further comprising dividing the optical transmitter's modulated signal output into first and second optical powers.

3. The method according to claim 2 further comprising inputting the first optical power into an interferometer.

4. The method according to claim 2 further comprising inputting the second optical power into an instrument that measures $E_r$.

5. The method according to claim 3 wherein calculating an $I_{wp}$ further comprises:
   setting the delay of a first interferometer path such that the difference of the delays between the first interferometer path and a second interferometer path (relative delay $\tau$) is zero;
   measuring peak power at $\tau=0$;
   setting the delay of the first interferometer path such that the difference of the delays between the first and second interferometer paths (relative delay $\tau$) is a large delay $\tau_{wing}$;
   measuring wing power at $\tau=\tau_{wing}$; and
   calculating a ratio between the wing and peak powers.

6. The method according to claim 4 wherein measuring the optical transmitter's output signal $E_r$ further comprises obtaining eye-diagram histograms.

7. The method according to claim 1 wherein the fitting is a quadratic curve fit.

8. The method according to claim 1 wherein the expression is captured as a Look-Up Table (LUT).

9. The method according to claim 1 wherein varying the optical transmitter modulation condition V(t) from nominal further comprises decreasing the modulator DC bias voltage $V_{bias}$ in predetermined steps until outside the range of interest.

10. The method according to claim 1 wherein varying the optical transmitter modulation condition V(t) from nominal further comprises increasing the modulator DC bias voltage $V_{bias}$ in predetermined steps until outside the range of interest.

11. The method according to claim 1 wherein varying the optical transmitter modulation condition V(t) from nominal further comprises decreasing the modulator ac drive voltage $V_{AC}(t)$ in predetermined steps until outside the range of interest.

12. The method according to claim 1 wherein varying the optical transmitter modulation condition V(t) from nominal further comprises increasing the modulator ac drive voltage $V_{AC}(t)$ in predetermined steps until outside the range of interest.

13. The method according to claim 1 wherein varying the optical transmitter modulation condition V(t) from nominal further comprises decreasing and/or increasing the modulator DC bias voltage $V_{bias}$ in predetermined steps until outside the range of interest and/or decreasing and/or increasing the modulator ac drive voltage $V_{AC}(t)$ in predetermined steps until outside the range of interest.

14. The method according to claim 2 further comprising inputting the first optical power into a power meter and into an interferometer.

15. The method according to claim 14 wherein calculating an $I_{wp}$ further comprises:
   measuring peak power with the power meter;
   setting the delay of a first interferometer path such that the difference of the delays between the first interferometer path and a second interferometer path (relative delay $\tau$) is a large delay $\tau_{wing}$;
   measuring wing power at $\tau=\tau_{wing}$; and
   calculating a ratio between the wing and peak powers.

16. A method for measuring an optical transmitter extinction ratio ($E_r$) using a relationship between the transmitter's interferogram wing-to-peak ratio ($I_{wp}$) and an empirical $E_r$ measurement comprising:
   tapping into an optical line downstream of the optical transmitter;
   acquiring light from the downstream line;
   coupling the light to a bandpass filter;
   selecting a predetermined optical bandwidth;
   inputting the predetermined optical bandwidth into an interferometer;
   setting the delay of a first interferometer path such that the difference of the delays between the first interferometer path and a second interferometer path (relative delay $\tau$) is zero;
   measuring peak power at $\tau=0$;
   setting the delay of the first interferometer path such that the difference of the delays between the first and second interferometer paths (relative delay $\tau$) is a large delay $\tau=\tau_{wing}$;
   measuring wing power at $\tau=0$;
   calculating, by a processor, a ratio ($I_{wp}$) between the wing and peak powers; and
   using the relationship between the transmitter's $I_{wp}$ and empirical $E_r$ measurement, looking-up an $E_r$, by a processor, corresponding to the calculated $I_{wp}$.

17. The method according to claim 16 wherein the bandpass filter has an Equivalent Rectangular Bandwidth $\Delta f_{eq}$ and is adjusted to select one signal channel bandwidth from a plurality of signal channel bandwidths transported in the optical line.

18. The method according to claim 16 wherein looking-up an $E_r$ further comprises inputting the calculated $I_{wp}$ into a Look-Up Table (LUT) storing the transmitter's $I_{wp}$ and empirical $E_r$ measurement relationship.

19. The method according to claim 16 wherein looking-up an $E_r$ further comprises inputting the calculated $I_{wp}$ into an equation for $E_r$ that has a quadratic dependence on the transmitter's $I_{wp}$ and empirical $E_r$ measurement relationship.

20. A method for measuring an optical transmitter extinction ratio ($E_r$) using a relationship between the transmitter's interferogram wing-to-peak ratio ($I_{wp}$) and an empirical $E_r$ measurement comprising:
   tapping into an optical line downstream of the optical transmitter;
   acquiring light from the downstream line;
   coupling the light to a bandpass filter;
   selecting a predetermined optical bandwidth;
   inputting the predetermined optical bandwidth into a power meter and into an interferometer;

measuring peak power with the power meter;

setting the delay of a first interferometer path such that the difference of the delays between the first interferometer path and a second interferometer path (relative delay $\tau$) is a large delay $\tau_{wing}$;

measuring wing power at $\tau=\tau_{wing}$;

calculating, by a processor, a ratio ($I_{wp}$) between the wing and peak powers; and using the relationship between the transmitter's $I_{wp}$ and empirical $E_r$ measurement, looking-up an $E_r$, by a processor, corresponding to the calculated $I_{wp}$.

* * * * *